United States Patent [19]

Herndon et al.

[11] Patent Number: 5,139,857
[45] Date of Patent: Aug. 18, 1992

[54] COMPOSITE ARTICLE COMPOSED OF RIGID COMPONENTS WITH DIFFERENT COEFFICIENTS OF THERMAL EXPANSION

[75] Inventors: Reba S. Herndon, Horseheads, N.Y.; Ronald E. Johnson, Tioga, Pa.; Jean M. News, Storrs, Conn.

[73] Assignee: Corning Incorporated, Corning, N.Y.

[21] Appl. No.: 624,055

[22] Filed: Dec. 7, 1990

[51] Int. Cl.$^5$ .................... B32B 27/38; G02C 7/10
[52] U.S. Cl. .................... 428/220; 428/416; 428/417; 428/426; 428/425.6; 428/425.8; 428/415; 351/163; 351/166; 351/177
[58] Field of Search ............... 428/417, 413, 426, 416, 428/220, 425.6, 425.8

[56] References Cited

U.S. PATENT DOCUMENTS

| | | | |
|---|---|---|---|
| 4,432,832 | 2/1984 | Fantone | 428/417 X |
| 4,554,299 | 11/1985 | Liggett | 528/64 X |
| 4,756,972 | 7/1988 | Kloosterboer et al. | 428/417 X |
| 5,064,712 | 11/1991 | Fretz, Jr. | 428/212 |

*Primary Examiner*—P. C. Sluby
*Attorney, Agent, or Firm*—Milton M. Peterson; Clinton S. Janes, Jr.

[57] ABSTRACT

There are disclosed a method of bonding components having substantially different coefficients of thermal expansion, and composite articles thus produced. The components are bonded with the cured product of an adhesive formulation composed essentially of a hydrogenated epoxide, an acrylate or blocked isocyanate end-capped urethane oligomer and an amine curing agent. Optionally, the formulation may contain an accelerator, an epoxy diluent and other minor ingredients.

21 Claims, No Drawings

COMPOSITE ARTICLE COMPOSED OF RIGID COMPONENTS WITH DIFFERENT COEFFICIENTS OF THERMAL EXPANSION

FIELD OF THE INVENTION

The field of the invention is a composite article in which the components have substantially different coefficients of thermal expansion, and are bonded together by the cured product of a liquid, thermosetting, adhesive formulation.

BACKGROUND OF THE INVENTION

The difficulties encountered in bonding rigid components that have different coefficients of thermal expansion (CTEs) are well recognized. Where components are joined in a thermal operation, such as fusion, the components may separate, or fracture, on cooling, particularly if the CTE differential is over $20 \times 10^{-7}/°$ C. Even where a cold seal can suffice, there remains the tendency for failure if the article is subjected to thermal changes in service. The situation is further complicated where one of the components is glass, since a glass surface tends to check whenever the glass is stressed in tension above a critical level. For this reason, laminates involving glass are much more sensitive than other materials to equal expansion differences.

Accordingly, special care has been exercised, and special materials developed, to produce composite articles, such as glass-metal or glass-polymer combinations. The use of an elastomeric adhesive is widely practiced, but few of these materials meet the stringent requirements for laminates involving glass where long term optical clarity and long term adhesion retention are both equally important.

Silicones are elastomeric adhesives which are well known to show excellent adhesion to glass. They can also exhibit excellent optical clarity. Adhesion to other surfaces may be less than satisfactory, however. For example, after thermal cycling between 80° C. and −40° C. for an extended period, a silicone bond between a rhodium plated silver ornament and glass surfaces failed at less than 20 lbs. pull due to lack of adhesion to the metal surface. In contrast, a good seal will withstand a pull of over 100 lbs. Consequently, adhesives other than silicones must be employed for certain laminate applications.

For such purposes, epoxies have often been considered. However, they inherently tend to be rigid and brittle, rather than elastic and flexible. Many formulation adjustments are known which increase flexibility; however, when these were evaluated, it was found that they generally resulted in the loss of other desirable properties. It has been particularly difficult to formulate low modulus, epoxy adhesives which exhibit high elongation without sacrificing the desired high stoichiometric ratio between the epoxy and the curing agent. An epoxy tended to transition from a strong, tough material to a soft, weak material whenever the modulus was lowered by means of traditional formulation changes when the stoichiometric ratio was maintained over about 75%.

Recently, numerous applications have arisen where it would be very desirable to join a glass component with a rigid plastic or metal body having a very different CTE value. Most glasses of commercial or ornamental interest have CTE values below $100 \times 10^{-7}$ °C. In contrast, metals, such as iron alloys and precious metals, and rigid plastics, such as epoxies, tend to have CTEs much above $100 \times 10^{-7}/°$ C.

One such application occurs in connection with certain works of art. A casting of precious metal is bonded to a molded body of an art glass having a high lead content. Precious metals, such as silver and gold, have CTEs on the order of 150 to $200 \times 10^{-7}/°$ C., whereas of the lead glass is on the order of $90 \times 10^{-7}/°$ C. Such a difference precludes bonding, either directly, or by a vitreous seal.

It is possible to join the bodies by thermally softening the glass, but the metal tends to separate on cooling, usually taking a fragment of glass with it. For this application, then, a bonding material must be tough, and must have good tensile strength and elongation, while having a low enough modulus to prevent excessive stresses at the glass interface. The tensile strength should be at least 250 psi, preferably over 500 psi; the modulus should be less than $10^4$ psi; and the elongation should be at least 50%.

Another application is an ophthalmic, glass-plastic, laminated lens. Such a composite body is described in U.S. Pat. No. 4,793,703 (Fretz, Jr.); also in U.S. Pat. No. 5,064,712 (Fretz, Jr.). Both patents describe a three-layer composite lens composed of an inorganic glass layer, a rigid organic plastic layer, and a flexible organic adhesive. The flexible adhesive is the product of an epoxy mixture that is cured at room temperature with an aliphatic amine curing agent.

This lens application, both because of the larger bonding area involved and the higher coefficient of thermal expansion of the plastic lens, requires an adhesive exhibiting an even lower modulus, with a moderate tensile strength and a high elongation value. Thus, the 10% secant modulus must not exceed 500 psi and is preferably less than 200 psi; the tensile strength must be over 100 psi, and preferably over 200 psi; the elongation at least 75%, and preferably over 100%.

In any product application, retention of properties on aging is critical. Both adhesion and cohesion must be retained upon aging to maintain adequate performance. Thus, loss of elongation or tensile strength may lead to delayed failure. An increase in modulus would, of course, be undesirable, since the adhesive would become less able to compensate for any thermal expansion difference that occurs. Moreover, in optical applications, long term retention of optical clarity and freedom from color are critical.

PURPOSES OF THE INVENTION

One purpose is to provide an improved method of bonding components having widely differing CTE values.

Another purpose is to provide a novel family of liquid, thermosetting, adhesive formulations adapted to bonding components having widely differing CTE values.

A further purpose is to provide an epoxy-based adhesive having a superior elongation capability.

Yet another purpose is to provide a novel seal in a composite article composed of a glass component and a metal or plastic component.

A still further purpose is to provide a composite article composed of a glass component bonded to a metal or plastic component.

SUMMARY OF THE INVENTION

The composite article of our invention is composed of at least two components bonded together by a thin layer of a flexible epoxy adhesive, the two components having substantially different CTEs, and the adhesive layer being the cured product of an adhesive formulation consisting essentially of a hydrogenated epoxide, a blocked isocyanate end-capped, or an acrylate end-capped urethane oligomer, and an amine curing agent. The isocyanate end-capped oligomer may have, as a blocking agent, an aliphatic phenol, such as nonyl phenol, and the epoxide may be a hydrogenated diglycidyl ether of bisphenol A (DGEBA) epoxide.

Another aspect of the invention is a method of bonding together components having substantially different CTEs which comprises applying, between opposing surfaces on the components, an epoxy adhesive formulation that wets those surfaces, the epoxy adhesive formulation consisting essentially of a hydrogenated epoxide resin, an isocyanate or acrylate end-capped urethane oligomer and an amine curing agent, and curing the formulation to a flexible, epoxy, adhesive layer having a high elongation characteristic, and being adherent to the opposing surfaces.

The invention also resides in the novel adhesive formulation employed in the bonding method just recited.

PRIOR ART

Applicants are unaware of more relevant prior art than the Fretz, Jr. patents mentioned above, and the several patents made of record therein. In particular, Applicants are unaware of the organic adhesive formulation, recited above, being known, or used, for bonding purposes in accordance with their present invention.

A number of publications disclose work on rubber-modified epoxies as a means to provide toughness to epoxy formulations. These materials have been found satisfactory for many glass-to-metal applications, but are inherently translucent or opaque due to their two-phase morphology. Consequently, they are unsuitable for optical applications. Even in applications such as works of art, it is essential that the adhesive be practically "invisible" to an observer. Consequently, only an adhesive as transparent as the glass can be employed.

As mentioned earlier, the art is well aware that silicone adhesives have excellent adhesion to glass, and can have excellent optical clarity. For some laminate applications, then, they are quite satisfactory. However, such silicone adhesives were thoroughly tested for present purposes, that is, for a glass-plastic, laminated ophthalmic lens and for a bond between precious metals and glass. The silicone adhesives were unsatisfactory for both purposes.

GENERAL DESCRIPTION OF THE INVENTION

The present invention arose from a search for liquid, thermosetting, adhesive formulations having properties superior to the adhesive, formulations disclosed in the Fretz, Jr. patents. Those formulations generally involved mixtures of aromatic epoxides cured with a polyoxypropylene diamine curing agent.

In order to obtain the desired physical properties, such as elongation and modulus, the formulations contained 50 to 75% of the theoretical amount of amino groups required to fully react with the equivalent epoxy groups present. This stoichiometric imbalance was necessary, since an amino group content above the 75% stoichiometric limit invariably resulted in increased moduli values and loss of elongation. Compensatory formulation changes could be made to retain a low modulus, such as adding monofunctional additives, but a high elongation value could not be recovered. The conventional changes to decrease the modulus at high stoichiometry invariably resulted in material having low toughness.

In general, the formulations contained a mixture of aromatic epoxides and aliphatic amines with the aromatic epoxides comprising as much as 50 to 60%. The formulations proved somewhat successful in initially producing satisfactory composite, glass-plastic lenses. However, problems developed on aging. One problem was development of a yellow tinge because of the high level of aromatic constituents. It was also found that loss of adhesion, or glass cracking, could occur under various use conditions as the product aged. These latter problems were found to be inherent, because of the substantial stoichiometric imbalance. Tertiary amine groups generated during the amine-epoxy reaction, catalyze epoxide-epoxide and epoxide-hydroxyl reactions as the material ages. This results in continuing cure, and consequent loss of properties, such as flexibility. In turn, this ultimately results in delamination of the lens.

Accordingly, studies were initiated to seek changes that would solve the aging problems. Efforts at optimizing the Fretz, Jr. formulations yielded small improvements in some properties, but invariably were canceled by loss of other properties. For example, a modification that improved elongation required a compensating change, to maintain strength, that effectively canceled the improvement. Among the unsuccessful formulation changes studied were incorporating monofunctional additives, blending with flexible aliphatic epoxies, such as epoxidized polypropylene glycol, using a variety of amine-functional curing agents, and using mercaptan-functional curing agents. None of these excursions produced an acceptable combination of properties. The basic problem appeared to be achieving a balance of low modulus with high toughness at a high stoichiometry. Invariably, increases in stoichiometry resulted in higher moduli and loss of elongation.

This led to studies focused on other formulation families. Numerous alternatives were investigated with little success, until the present combination of an isocyanate or acrylate end-capped urethane oligomer with a hydrogenated epoxy was discovered. Thus, the present invention provides a basically different family of adhesive formulations. This family is unique in that it provides a desirable set of adhesive properties with an amine to epoxy stoichiometry of 75-100%.

The term "oligomer" is used in its usual sense to indicate an intermediate that is comprised of monomers polymerized to a low molecular weight and adapted to be subsequently further polymerized, cross-linked, or otherwise treated to produce an end product. In our present invention, the term is used with reference to formulation components that are reacted and cured to provide the desired epoxy adhesive.

The present formulations consist essentially of a hydrogenated epoxy, an isocyanate or acrylate end-capped urethane oligomer, and an amine curing agent. Additionally, the formulations may, if desired, contain epoxy diluents to modify viscosity, a reaction accelerator, and a functional silane to promote adhesion. We prefer a hydrogenated diglycidyl ether of bisphenol A as the epoxy. The amine curing agent is preferably a cycloaliphatic diamine. If an isocyanate end-capped urethane oligomer is used, it is preferably blocked with an aliphatic phenol, such as nonyl phenol. This avoids the isocyanate groups reacting at too rapid a rate.

A preferred family of adhesive formulations is as follows,
100 parts by weight of epoxide functional resins consisting of:
50-90 hydrogenated diglycidyl ether of bisphenol A,
0-30 diglycidyl ether of 1,4 butanediol, or other difunctional epoxide diluent,
0-30 flexibilizing diepoxide, such as diglycidyl ether of polypropylene glycol
In addition to 100 parts of the above, the formulation further contains, in part by weight:
20-100 isocyanate, or acrylate, end-capped urethane oligomer; blocked with nonyl phenol if isocyanate end-capped
0-6 epoxide-amine accelerator
0-2 amino or epoxy functional silane
0-10 modifying additives such as anti-oxidants, stabilizers, epoxy grade triphenyl phosphite diluent, etc.

The formulation further includes a cycloaliphatic diamine in an amount equivalent to 75-110%, preferably 85-95%, of the total stoichiometry of the epoxide-urethane blend.

A unique feature of the present formulation family is the use of a hydrogenated epoxy. This is in contrast to prior use of aromatic epoxies. The hydrogenated bisphenol A epoxy has a tremendous advantage over the aromatic bisphenol A epoxy, because its optical clarity is maintained over long periods of UV exposure without yellowing, or other loss of properties. It was also found that the hydrogenated bisphenol A epoxide itself facilitated attaining the desired balance of physical properties. It contributed somewhat itself, when substituted for its aromatic equivalent, to a lower modulus at equivalent stoichiometry without a significant loss in elongation, or other desirable properties, such as adhesion. In our studies, we have used a hydrogenated diglycidyl ether of bisphenol A, available from Shell Chemical under the designation Eponex 1510. However, other hydrogenated epoxies might also be used if available.

Another unique feature of our formulations is the end-capped urethane oligomer. The urethane is formed as a reaction product between a diisocyanate and a polyether polyol. The oligomers can be isocyanate end-capped, with the isocyanate blocked with a phenol, such as nonyl phenol, or can be reacted with acrylic acid to create acrylate end-caps. In the former case, when added to amine-cured epoxy formulations, the urethane unblocks, and the isocyanate reacts with the amine, forming urea linkages. Hence, the modification may be considered to be a urethane-urea modification. In that case, for example, the polymer may be one designated as Desmocap 11A. This polymer is referred to as having an apparent epoxide equivalent weight of 930 for formulation convenience.

In the second case, wherein an acrylate end-capped urethane oligomer is employed, the acrylate functional group reacts directly with the amine. In this case, for example, a material designated as Ebecryl 270 may be used. Ebecryl 270 is stated to have an apparent epoxide equivalent weight of 750. The term, "apparent epoxide equivalent weight" is supplied for these non-epoxide functional oligomers as a formulation convenience in determining the stoichiometric balance with the amine functional constituent.

In developing our inventive formulations, we initially used a commercial urethane oligomer available from Mobay Chemical Company under the designation Desmocap 11A. This oligomer is blocked with nonyl phenol. However, other known blocking agents may be substituted. The use of a blocking agent allows the reaction between the isocyanate on the urethane and the amine groups to proceed in a controlled manner. Otherwise, the reaction is extremely vigorous, resulting in development of numerous short chains and consequent loss of the desired properties. The reaction in fact is so rapid that it may even be difficult to mix to a fully homogeneous composition before localized reactions would occur. The blocked isocyanate also provides stability when the urethane is preblended with the epoxide component.

Initially, the urethane polymer was blended with an aromatic epoxy available from Dow Chemical under the designation DER 332. This resulted in formulations having undesirably high moduli and Tg values. Again, when compensating changes were made in the formulation to lower the modulus value, invariably one or more of the other desired properties was lost. These formulations lacked the desired property balance even when mixed with a flexible, aliphatic epoxy such as DER 732.

In like manner, it has been found that hydrogenated epoxies fail to provide the desired properties when mixed with polymers other than the urethane oligomers of our formulation family. Thus, it appears that combining the urethane oligomers with the hydrogenated epoxy yields a synergistic effect. Thereby, the disadvantages, incurred when either is used in other formulations, are mutually overcome.

The third essential ingredient in our formulation family is an amine curing agent. We prefer a cycloaliphatic diamine available from Ajinomoto that is known under the designation Ajicure B001. This curing agent tends to provide enhanced elongation values. Various other cycloaliphatic amines are also readily available, and may be used in known manner.

A particularly important feature of our invention is based on the discovery that, in our formulation family, the amine curing agent can be used in higher stoichiometric ratios to the epoxy than had previously been possible. Thus, prior formulations lost the desired property balance at ratios above about 75% amine to epoxy groups. The present formulations retain satisfactory properties up to 100%. However, it can be advantageous to provide a small excess of epoxy groups to promote adhesion to glass surfaces that are pretreated with an amino-functional silane. Accordingly, we generally prefer a ratio of amine to epoxy groups in the range of 85-95%.

The significance of the higher amine to epoxy ratio becomes apparent when the delayed action of an amine in an unbalanced formulation is considered. In the reaction of an amine with an epoxide, each primary amine group is actually difunctional. After the initial amine-epoxy reaction, a secondary amine group remains which can further react with the epoxy to form a tertiary amine. These tertiary amine groups, with time, can catalyze epoxy-epoxy and epoxy-hydroxyl reactions. This results in increased cross-link density and, in consequence, loss of flexibility. In general, the moisture sensitivity also increases substantially at offset stoichiometry, although excess epoxy in this regard is often not as detrimental as excess amine. For this latter reason, excess amine is rarely used.

Another advantage of the proposed formulations is lower aromatic content. Prior liquid epoxy adhesives had aromatic constituents in the 50-60% range; whereas the present adhesives have an aromatic constituent level that is generally less than 35%, and may even be 0% in some cases. For example, when the blocked polyurethane, Desmocap 11A is used, the diisocyanate and the phenol blocking agent are the only aromatics. Where the acrylate end-capped urethane oligomer, Ebecryl 270, is employed, the oligomer is completely aliphatic, thereby entirely avoiding aromatic ingredients. The percentages are based on the percentage of constituents which contain aromatic groups.

Aromatic groups are undesirable because they lead to poor UV stability. Aging under exposure to ultra-violet light leads to color development, as well as other property changes.

Members of the present formulation family are adapted for use in applications where bonding of materials having different CTEs is required. Thus, properly formulated adhesive formulations will exhibit tensile elongations of at least 75% at stoichiometries of at least 75%.

One particular application is the laminated glass-plastic ophthalmic lens. For this application, formulations are available having a 10% secant modulus less than 200 psi with tensile strengths over 100 psi. Of particular interest are elongation values over 100 percent.

Another application involves bonding small, precious metal ornaments to a glass surface. Here, very high elongation is of less significance than is greater strength. For this purpose, formulations are available where the 10% secant modulus can be less than $10^4$ psi and the tensile strength over 500 psi.

SPECIFIC EMBODIMENTS OF THE INVENTION

Six exemplary formulations are set forth in TABLE I below, together with relevant properties for each. Formulations 1-3 are low-modulus, high-elongation formulations adapted to the ophthalmic application described earlier. Formulations 4-6 are higher strength, tough adhesive formulations better adapted to glass-metal bonding applications.

In the formulations, except for Example 4, the epoxy and the urethane oligomers are Eponex 1510 and Desmocap 11A, respectively, as identified earlier. Example 4 uses the acrylate end-capped, urethane oligomer, Ebecryl 270. Likewise, the amine curing agents are Ajicure B001, Ancamine 1895, Epi-cure 8799, or mixtures thereof. These are available from Ajinomoto, Pacific-Anchor and Hi-Tek, respectively. The diluents are DER 732 from Dow Chemical and Heloxy—67 from Hi-Tek. The silane is Prosil 221 from PRC; accelerators are 399 from Texaco and Weston EGTPP from GE.

TABLE I

|  | 1 | 2 | 3 |
|---|---|---|---|
| Eponex 1510 | 70 | 70 | 80 |
| DER 732 | — | 20 | — |
| Heloxy-67 | 30 | 10 | 20 |
| Desmocap 11A | 80 | 60 | 60 |
| Accelerator 399 | 4 | 2 | — |
| Ajicure B001 | 55 | 50 | 11.6 |
| Prosil 221 | 1 | — | 1 |

TABLE I-continued

| Epi-cure 8799 | — | — | 24.9 |
|---|---|---|---|
| Stoichiometry | 80 | 90 | 80 |
| Gel time (sec)* | 2200 | 2300 | 4000 |
| Tensile str. (psi) | 110 | 130 | 175 |
| 10% sec. mod. (psi) | 200 | 180 | 220 |
| % elongation | 90 | 110 | 125 |

|  | 4 | 5 | 6 |
|---|---|---|---|
| Eponex 1510 | 70 | 70 | 70 |
| DER 732 | 20 | 20 | 30 |
| Heloxy-67 | 10 | 10 | — |
| Desmocap 11A | — | 60 | 60 |
| Ebecryl 270 | 60 | — | — |
| Accelerator 399 | 3 | 3 | 2 |
| Ajicure B001 | 25.8 | 24.7 | — |
| Prosil 221 | — | 1 | — |
| Weston EGTPP | — | 5 | — |
| Ancamine 1895 | 17.6 | 17.3 | 30.8 |
| Stoichiometry | 90 | 90 | 90 |
| Gel time (sec)* | 3940 | 1740 | 2450 |
| Tensile str. (psi) | 380 | 665 | 1200 |
| 10% sec. mod. (psi) | 800 | 1225 | 4700 |
| % elongation | 80 | 90 | 75 |

*5 gram sample at 65° C. using a Sunshine gel timer.

The tensile strength, modulus and elongation values were determined using Instron test equipment in accordance with procedures prescribed in ASTM Procedure D- 638.

In addition, a test, designated as the stress rig test (SRT), was designed to test the strength of an adhesive bond in a glass-plastic laminated lens under widely varying ambient conditions. The SRT was intended to simulate, in the testing laboratory, delamination failures that occurred in a field test. The test is carried out by clamping opposite edges of a laminated lens between stainless steel metal bands. The bands are mounted on screw-threaded posts and a continuously increasing force may be applied through a cam arrangement on one of the posts. The metal bands are intended to simulate an aviator style, metal eyewire, and are pivoted at diagonally opposite ends in the assembly.

The test consists of applying a force downward on the plastic portion of the lens while subjecting the lens to elevated temperatures in water. The force is increased and both the water temperature and time of exposure are successively increased until failure of the lens occurs. The sample is baked at 100° C. at the end of the test. The severity of the conditions required for lens failure is then taken as a measure of the strength of the adhesive bonds in the lens.

Ratings in the SRT test system range from 1-8 with with 1 representing the least severe test; 7 the most severe test; and 8 no delamination in any of the tests. Thus, strength of adhesion, as determined in this test procedure, increases as the numerical rating increases. The following TABLE II sets forth the test conditions during which delamination occurs in order to receive each numerical ranking. Temperature is in ° C.; time in minutes and force in lbs.

TABLE II

| Rating | Temp. | Medium | Time | Force |
|---|---|---|---|---|
| 1 | 80° C. | $H_2O$ | 15 | 3 |
| 2 | 80° C. | $H_2O$ | 15 | 4 |
| 3 | 80° C. | $H_2O$ | 15 | 5 |
| 4 | 80° C. | $H_2O$ | 15 | 6 |
| 5 | 100° C. | $H_2O$ | 15 | 6 |
| 6 | 100° C. | $H_2O$ | 45 | 6 |
| 7 | 100° C. | oven | 60 | 6 |

TABLE II-continued

| Rating | Temp. | Medium | Time | Force |
|--------|-------|--------|------|-------|
| 8 | No delamination | | | |

The SRT test procedure was conducted on four sets of glass-plastic, laminated lenses having 14-21 individual lenses in each set. Two control sets were produced using an adhesive of the type described in patent -703 (Fretz, Jr.), noted earlier. The first set was made up manually; the second was taken from a pilot line. The adhesive of Example 1 in TABLE I, above, was used in a third set, and that of Example 3 was used in a fourth set.

The test results obtained from these four sets are set forth in TABLE III below. The results are in terms of the ratings 1-8, as described above, with the failures at each level shown in percent of the total number of lenses in the set.

TABLE III

| Sets | Below 5 | 5 | 6 | 7 |
|------|---------|-----|-----|-----|
| 1 | 15% | 53% | 21% | 11% |
| 2 | 19% | 57% | 19% | 5% |
| 3 | 0 | 36% | 21% | 43% |
| 4 | 6% | 19% | 50% | 25% |

The superiority of the present adhesives is readily apparent.

We claim:

1. In a composite article composed of at least two rigid components having substantially different coefficients of thermal expansion, opposing surfaces of the components being bonded together by a thin layer of a flexible, epoxy adhesive, the improvement wherein the flexible, epoxy adhesive is the cured product of an adhesive formulation consisting essentially of a hydrogenated epoxide, an acrylate or blocked isocyanate end-capped urethane oligomer and an amine curing agent.

2. A composite article in accordance with claim 1 wherein the article is a laminated, glass-plastic ophthalmic lens.

3. A composite article in accordance with claim 2 wherein the glass has a coefficient of thermal expansion not over $100 \times 10^{-7}/^\circ$ C., and the plastic has a coefficient of thermal expansion that is at least $200 \times 10^{-7}/^\circ$ C.

4. A composite article in accordance with claim 2 wherein the epoxy adhesive has an elongation over 75% and a modulus not over 500 psi.

5. A composite article in accordance with claim 1 wherein the article is composed of glass and metal components.

6. A composite article in accordance with claim 5 wherein the glass component has a coefficient of thermal expansion less than $100 \times 10^{-7}/^\circ$ C. and the metal component has a coefficient of thermal expansion greater than $100 \times 10^{-7}/^\circ$ C.

7. A composite article in accordance with claim 5 wherein the epoxy adhesive has a modulus less than $10^4$ psi and a strength of at least 500 psi.

8. A composite article in accordance with claim 1 wherein the coefficients of expansion of the components differ from each other by at least $20 \times 10^{-7}/^\circ$ C.

9. A composite article in accordance with claim 1 wherein the epoxy adhesive is the cured product of a liquid thermosetting formulation.

10. A composite article in accordance with claim 1 wherein the hydrogenated epoxide is hydrogenated diglycidyl ether of bisphenol A epoxide.

11. A composite article in accordance with claim 1 wherein the urethane oligomer is end-capped with blocked isocyanate groups.

12. A composite article in accordance with claim 1 wherein the urethane oligomer is end-capped with acrylate groups.

13. A composite article in accordance with claim 11 wherein the urethane oligomer is blocked with an alkyl phenol.

14. A composite article in accordance with claim 13 wherein the blocking alkyl phenol is nonyl phenol.

15. A composite article in accordance with claim 1 wherein the amine curing agent is a cycloaliphatic diamine.

16. A composite article in accordance with claim 1 wherein the adhesive formulation contains an accelerator for the epoxy-amine reaction.

17. A composite article in accordance with claim 1 wherein the adhesive formulation contains a difunctional epoxide diluent.

18. A composite article in accordance with claim 1 wherein the stoichiometric ratio of the amine groups on the curing agent to the amine reactive groups in the adhesive formulation is at least 75%.

19. A composite article in accordance with claim 18 wherein the stoichiometric ratio is in the range of 85-95%.

20. A composite article in accordance with claim 1 wherein the aromatic constituent level in the adhesive formulation is no over 35%.

21. A composite article in accordance with claim 1 wherein the adhesive formulation consists essentially of, in parts by weight,
   a. 100 parts of epoxide functional resins consisting essentially of:
      50-90 parts hydrogenated diglycidyl ether of bisphenol A,
      0-30 parts diglycidyl ether of 1,4 butanediol, or other difunctional epoxide diluent,
      0-30 parts flexibilizing diepoxide, such as diglycidyl ether of polypropylene glycol,
   b. 20-100 parts isocyanate, blocked with nonyl phenol, or acrylate, end-capped urethane oligomer,
   c. 0-6 parts epoxide-amine accelerator,
   d. 0-2 parts amino or epoxy functional silane,
   e. 0-10 parts modifying additives, selected from the group consisting of anti-oxidants, UV stabilizers, and epoxy grade triphenyl phosphite diluent,
together with a cycloaliphatic amine in an amount equivalent to 75-100 % of the stoichiometric requirement to fully react with the epoxide-urethane formulation.

* * * * *